US010653936B2

(12) United States Patent
Ganzer

(10) Patent No.: US 10,653,936 B2
(45) Date of Patent: May 19, 2020

(54) FREE KICK DISTANCE PROJECTING DEVICE

(71) Applicant: Natalis Ganzer, Matrei in Osttirol (AT)

(72) Inventor: Natalis Ganzer, Matrei in Osttirol (AT)

(*) Notice: Subject to any disclaimer, the term of this patent is extended or adjusted under 35 U.S.C. 154(b) by 0 days.

(21) Appl. No.: 15/503,582

(22) PCT Filed: Aug. 14, 2015

(86) PCT No.: PCT/AT2015/000108
§ 371 (c)(1),
(2) Date: Feb. 13, 2017

(87) PCT Pub. No.: WO2016/023051
PCT Pub. Date: Feb. 18, 2016

(65) Prior Publication Data
US 2017/0225056 A1 Aug. 10, 2017

(30) Foreign Application Priority Data
Aug. 14, 2014 (AT) .................... A 632/2014

(51) Int. Cl.
*A63B 71/06* (2006.01)
*A63C 19/06* (2006.01)
*F16M 11/18* (2006.01)
*G01C 15/00* (2006.01)
*B66D 1/38* (2006.01)
(Continued)

(52) U.S. Cl.
CPC ........ *A63B 71/0605* (2013.01); *A63C 19/065* (2013.01); *B66D 1/38* (2013.01); *F16M 11/045* (2013.01); *F16M 11/048* (2013.01); *F16M 11/18* (2013.01); *F16M 13/027* (2013.01); *G01C 15/004* (2013.01); *A63B 2071/0694* (2013.01); *A63B 2207/02* (2013.01); *A63B 2243/0025* (2013.01); *A63C 2019/067* (2013.01)

(58) Field of Classification Search
CPC ............................. G01C 15/00; A63B 71/06
See application file for complete search history.

(56) References Cited

U.S. PATENT DOCUMENTS 3,741,662 A * 6/1973 Pioch ................... G01C 15/002
356/399
4,090,708 A 5/1978 McPeak
(Continued)

FOREIGN PATENT DOCUMENTS

CN 202637866 1/2013
DE 101 24 012 1/2002
(Continued)

*Primary Examiner* — Eugene L Kim
*Assistant Examiner* — Christopher Glenn
(74) *Attorney, Agent, or Firm* — Wenderoth, Lind & Ponack, L.L.P.

(57) ABSTRACT

A display device for displaying a marking in the form of a distance to be kept between game equipment, in particular a football, and a participant on a playing field of a sports facility, includes a display device for projecting light beams representing the marking onto the playing field. The projected light beams display the distance to be kept, and can be projected at least in sections in the shape of a circle, for example at a distance of 9.15 m, around the game equipment on the playing field. The display device is jointly movable with a transport device that is movable above the sports facility.

19 Claims, 1 Drawing Sheet

(51) Int. Cl.
*F16M 11/04* (2006.01)
*F16M 13/02* (2006.01)

(56) References Cited

U.S. PATENT DOCUMENTS

| | | | | |
|---|---|---|---|---|
| 4,710,819 A | * | 12/1987 | Brown | F16M 11/10 |
| | | | | 212/76 |
| 5,174,571 A | | 12/1992 | Aubusson et al. | |
| 5,342,041 A | * | 8/1994 | Agulnek | A63B 24/0003 |
| | | | | 473/2 |
| 5,346,210 A | * | 9/1994 | Utke | A63B 24/0021 |
| | | | | 273/372 |
| 5,683,302 A | * | 11/1997 | Harrell | A63D 5/04 |
| | | | | 473/58 |
| 6,907,840 B1 | * | 6/2005 | Gaines | A63B 71/0605 |
| | | | | 116/222 |
| 6,976,928 B2 | * | 12/2005 | Hemphill | A63B 71/06 |
| | | | | 33/289 |
| 7,074,264 B2 | | 7/2006 | Vilarinho Dias | |
| 7,185,439 B1 | * | 3/2007 | Nubin | G01S 5/02 |
| | | | | 33/289 |
| 7,385,180 B2 | * | 6/2008 | Rueb | G03B 21/28 |
| | | | | 250/234 |
| 8,199,197 B2 | | 6/2012 | Bennett et al. | |
| 2004/0111903 A1 | * | 6/2004 | Amron | G01C 15/004 |
| | | | | 33/289 |
| 2004/0111905 A1 | * | 6/2004 | Amron | G01C 15/004 |
| | | | | 33/289 |
| 2005/0037872 A1 | * | 2/2005 | Fredlund | A63B 24/0021 |
| | | | | 473/407 |
| 2005/0162257 A1 | * | 7/2005 | Gonzalez | A63B 24/0021 |
| | | | | 340/323 R |
| 2005/0183273 A1 | * | 8/2005 | Amron | G01C 15/004 |
| | | | | 33/289 |
| 2007/0061365 A1 | | 3/2007 | Giegrich et al. | |
| 2007/0238539 A1 | * | 10/2007 | Dawe | A63B 24/0003 |
| | | | | 473/131 |
| 2008/0034598 A1 | * | 2/2008 | Boccardi | A63B 71/0605 |
| | | | | 33/289 |
| 2010/0026809 A1 | * | 2/2010 | Curry | H04N 5/222 |
| | | | | 348/157 |
| 2010/0137079 A1 | * | 6/2010 | Burke | A63B 24/0003 |
| | | | | 473/446 |
| 2010/0210377 A1 | * | 8/2010 | Lock | A63B 24/0003 |
| | | | | 473/409 |
| 2011/0013087 A1 | * | 1/2011 | House | A63B 24/0021 |
| | | | | 348/564 |
| 2011/0118062 A1 | * | 5/2011 | Krysiak | A63B 24/0006 |
| | | | | 473/570 |
| 2011/0169959 A1 | * | 7/2011 | DeAngelis | G06K 9/00724 |
| | | | | 348/157 |
| 2011/0204196 A1 | * | 8/2011 | Wharton | G03B 15/00 |
| | | | | 248/323 |
| 2011/0204197 A1 | * | 8/2011 | Wharton | G03B 15/00 |
| | | | | 248/323 |
| 2014/0168442 A1 | * | 6/2014 | Salomon | H04N 21/21805 |
| | | | | 348/157 |
| 2014/0192204 A1 | * | 7/2014 | Glazer | H04N 5/23296 |
| | | | | 348/169 |

FOREIGN PATENT DOCUMENTS

| | | |
|---|---|---|
| DE | 601 06 410 | 9/2005 |
| DE | 10 2006 020 0 | 12/2006 |
| DE | 10 2007 049 1 | 4/2009 |
| EP | 0 423 218 | 4/1994 |
| EP | 2 012 886 | 11/2010 |
| GB | 2 401 231 | 11/2004 |
| WO | 01/77571 | 10/2001 |
| WO | 2007/030665 | 3/2007 |
| WO | 2011/079122 | 6/2011 |

\* cited by examiner

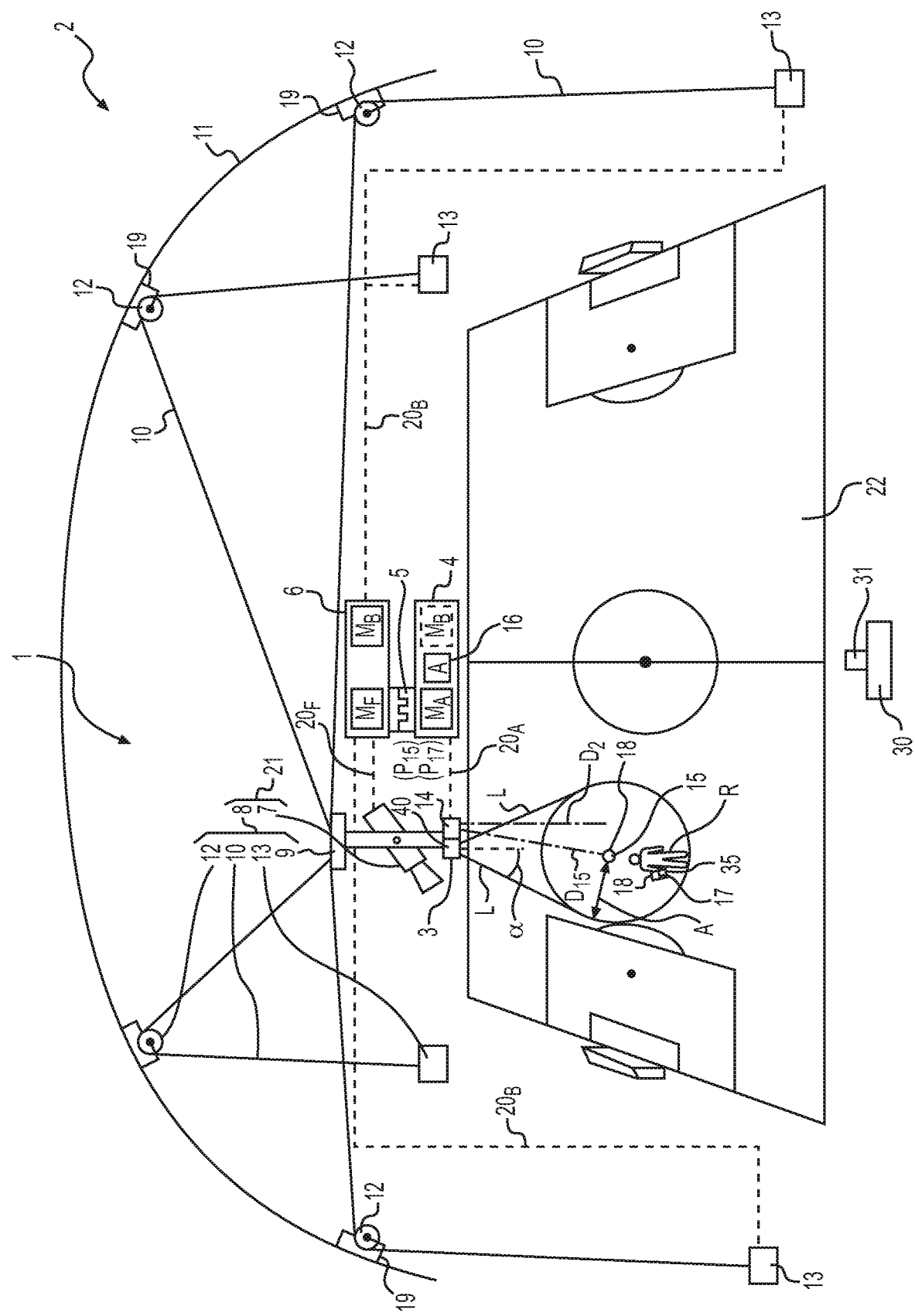

FREE KICK DISTANCE PROJECTING DEVICE

RELATED APPLICATIONS

This application is a National Phase Application which claims priority under 35 U.S.C. § 371 of International Patent Application No. PCT/AT2015/000108 filed Aug. 14, 2015, which claims priority to Austrian Patent Application No. A 632/2014, filed Aug. 14, 2014, the entire contents of each are hereby incorporated by reference herein.

BACKGROUND OF THE INVENTION

The invention generally concerns a device for displaying a marking, in particular a line or a distance, on a playing field of a sports facility.

Generally, there has always been the necessity in most sports to regiment the game in order to be able to play it fairer. A substantial feature is to edge the playing field. For that reason lines are drawn or other markings are correspondingly applied on the surface of the playing field before the game.

A variant to provide the same surface easily with boundaries for different sports is disclosed in the EP 0 423 218 B1. This is effected in that marking lines are projected onto the playing surface via a laser. Thus, these projected lines temporarily define the playing field markings on an otherwise unmarked surface and it can be fast switched between different sports.

In addition, more and more technical aids are used in many sports in order to organize the game fairer, more attractive, clearer, faster and more thrilling. Also more analyzing possibilities are used for spectators, coaches and players after the game. Also aids for referees are more often used.

An example of such a monitoring device on a playing field is disclosed in DE 10 2006 020 018 A1. This is especially about promptly informing referees during their decision making regarding the rule observance on the basis of objective factual findings which, however, does not challenge their decisions. For that reason, playing field points are calculated, an operating unit is provided, a camera unit together with a control and evaluation unit is used, and a display unit for replaying the events of the game is used, so that each game situation is reproducible, evaluable and displayable via a display unit and can be supplied for an analysis.

A similar system is described in DE 10 2007 049 147 A1 which is about the use of a sensor system for detecting movement sequences of persons, sport equipment, and game situations in sports. For that reason, sensor devices in the form of PMD sensors are provided. A camera can be associated with each sensor device. The sensor system is thus formed in such a way that corresponding distance information detected by the associated sensor device is associated with objects, which are displayed with the aid of the camera. For example, an evaluation unit determines by predefined algorithms whether a rule violation has happened, thus whether the ball has passed the touchline or one of the bylines at goal or whether a player was offside in the moment of the pass. Furthermore, an evaluation can be effected in such a way that it is determined whether the ball has passed the goal line or not.

A latter variant with a display of whether a goal was scored or not was successfully utilized for the first time on a large scale during the Football World Cup 2014 under the name of "Goal Control".

However, in order to not only enable a verification or a monitoring in hindsight, but to utilize technical aids already during the game, several aiding systems are known from some other sports.

For example, the U.S. Pat. No. 4,090,708 shows a possibility in order to project the most relevant distance lines (first down line and line of scrimmage) during an American football game via laser onto the field. For that reason lasers move on guide rails attached alongside the playing field, wherein during the game the corresponding lines are displayed across the playing field by the lasers.

With the Football World Cup 2014, a further technical aid for the use during a football game has been established, namely the so-called "free kick spray". With the aid of this spray, the referee can mark the position of the ball visibly for each player during the game when there is a free kick and can also spray the necessary free kick distance of 9.15 m to the ball onto the playing field, so that the opposing team forms the wall in the correct distance to the ball. Thereby, the fairness is improved and also the observing of the necessary distance is mostly effected faster than with the sheer forcing back by the referee. An example for the exact composition and use of such a spray is disclosed in the DE 601 06 410 T2.

This system introduced only recently has indeed proved beneficial already, but still has disadvantages. For example, the sprayed distance is still based on the estimation of the referee and thus can significantly differ from the rule-consistent 9.15 m. Moreover, this distance is valid in a circle around the football; however, the distance is mostly only sprayed in an area facing in the direction of the football goal. So it can happen that a player which is beside the wall and beside the sprayed line is considerably nearer to the football than allowed. Thus, for example, in the case of a short passed free kick, this player is illegally too fast at the ball and at the opponent.

The invention thus concerns a device for displaying a marking in the form of a distance to be kept between a game equipment, in particular a football, and a participant on a playing field of a sports facility. Such a display device includes a display device for projecting light beams representing the marking onto the playing field, wherein the projected light beams display the distance to be kept and can be projected at least in sections in the shape of a circle, in particular at a distance of 9.15 m, around the game equipment on the playing field. Further, the invention concerns a method for projecting such a marking on a playing field.

With such a display device, the exact distance of a player to the ball can therefore be displayed around the ball, whereby the disadvantages of the "free kick spray" are remedied. Such a device for generating a marking on a playing field is disclosed in DE 101 24 012 A1. There, a laser or light source is provided, wherein, by the corresponding light beams, the markings are generated on the playing field. This device can be operated by a remote control. A circle line with a predefined radius is generated by a light beam on the playing field around a point on the playing field. This device is mounted above the playing field, in particular on a roof of the stand and/or on a mast like a flood light mast. By this stationary device, the laser beams are bundled via a lens system and are directed onto the playing field. Also several such devices can be provided.

A quite similar system is disclosed in the US 2005/0162257 A1. A laser light beam is projected on the playing field also from a stadium roof or from masts in order to display the necessary free kick distance. This system can be activated via the whistle of the referee. It is noted that a "spot light" mechanism automatically focuses on the position of the ball. The detailed configuration, though, is not mentioned.

Disadvantageously in both systems, it cannot be guaranteed that the desired marking is entirely displayed because participants can be in the way. Especially if the light source is attached to a mast or to the stadium roof behind the wall, the marking cannot be displayed in front of the wall. This problem could be prevented in that several light sources from different angles are directed on the playing field which, however, would lead to considerable extra costs and to a multiplication of the necessary components. Moreover, there is still the disadvantage that the distance to the playing field is very large depending on the stadium height and breadth, wherefore powerful and thus cost-intensive lasers must be used in order to reach a sufficiently visible display of the marking. Additionally, the position of the ball often cannot be determined for certain, especially when the ball is hidden for the remote control arranged relatively far away from the "spot light" mechanism. Thus, it cannot always be guaranteed that the system even "knows" or can detect where the ball is just situated.

SUMMARY OF THE INVENTION

The object of the present invention, thus, is to establish an improved display device and an improved method of displaying a distance mark compared to the prior art. In particular, the device for displaying a marking on a playing field of a sports facility should be easily operated, constructed simply, produced cost-effectively, and applicable flexibly.

Therefore, it is provided according to the invention that a display device is jointly movable with a transport device that is movable above the sports facility. This transport device can be conceptualized specifically for the transport of the display device, and can only be used for that reason. Thus, an individual and fast display of the desired distance or distance requested by the referee can be effected. By the movability, the display device can always be positioned optimally. The display device is, preferably detachably, fastened to the transport device.

In principle, it is possible that the transport device flies autonomously. Hence, the transport device can be formed, for example, as an unmanned aircraft, preferably in the form of a drone. Particularly preferred, however, a camera for filming a football match on the playing field is, preferably detachably, fastened to the transport device, wherein the transport device and the camera form a camera system and the display device is jointly movable with the camera system. Thereby, the advantage is reached that a camera system "floating" or "flying" above the playing field is used as a movement device for the display device. Such camera systems are, anyhow, used in more and more stadiums. This means that only one single display device must be present. Moreover, the display device can be moved very near (for example 3 meters) to the area to be marked. Additionally, the display device can always be positioned in front of the wall, whereby no participant interrupts the light beams before reaching the surface of the playing field when having the rule-consistent distance.

According to a preferred embodiment, the device comprises a display control device which comprises a display mode in which the display device can be controlled for projecting the marking onto the playing field.

For the explanation of the specific scope of protection, it is to be noted that the transport device does not have to be necessarily a part of the display device. Rather, the display device according to the invention can be retrofitted on an existing transport device (especially on an existing camera system). In this case, the display device is jointly movable with this transport device (or with this camera system), and the display control device comprises a suitable electronic interface to a (camera system) control device. This computational-logical connection of both control devices via the interface is especially important for determining the position of the transport device and thus for the position of the display device. Moreover, the movement data are linked. If in the following description the 'camera system' is mentioned, then each feature or each advantage should always be understood also for the plain transport device without the camera—as long as it is logical and meaningful.

Per se it can be provided that the controlling of the spatial movement of the camera system is only effected via the camera control device. Preferably, however, the display control device can comprise a movement mode in which the movement of the transport device, preferably of the whole camera system, above the playing field can be controlled. This means the display control device is (so to speak) taking command of the spatial movement of the camera system and, thus, of the display device above the playing field.

Of course, a display device cannot only be retrofitted on an existing system. Rather, according to a preferred embodiment, the transport device or the whole camera system can also be part of the device. In this case, the camera system preferably comprises a camera system control device. According to this embodiment, thus, the display device, the transport device and the corresponding control—without the camera—are part of the scope of delivery. Preferably, the display device is mounted to the transport device. Additionally, the transport device can comprise a carrier device for the camera including at least two, and preferably four, lines (such as ropes) fastened to the carrier device, guide rollers for the ropes fastened above the playing field, preferably on a roof of a stadium, and drive devices for the ropes Basically, the camera of the camera system can only be mounted in the stadium by the television broadcaster on the preinstalled transport device. Particularly preferred, however, not only the transport device but also a camera movable above the playing field by the transport device is part of the device. This camera is also signally connected to the camera system control device.

Examples for complete camera system are known from the prior art. The U.S. Pat. No. 4,710,819 for example shows a suspension system for camera for a television broadcast of an NFL football game. Instead of the camera, a laser can also be transported by this suspension system. The WO 01/77571 A1 shows a cable-controlled device for guiding a camera at a distance over a base path. The WO 2011/079122 A1 shows a movement system for a camera above a playing field. Here a laser can be used for calibrating the whole system. The U.S. Pat. No. 8,199,197 B2 also shows a camera system movable in the air with a safety device. A laser can be used for detecting the position. The WO 2007/030665 A2 shows a camera system movable above a playing field in an indoor stadium. An advertising medium for example in the form of a projector is also mounted to this camera system. Advertising images can be projected in the area of the venue with the projector.

For the exact positioning or mounting of the display device, preferably the display device is directly mounted to the camera or indirectly mounted on the transport device moving the camera. For example, the display device can be fixedly welded to the carrier device of the transport device. Preferably the display device is mounted detachably, for example, via screws or via a clip system.

In order to cause few changes in an already installed system, preferably the camera system control device on the one hand comprises a recording mode in which the filming effected by the camera, preferably also movements of the camera effected relative to the transport device, can be controlled. On the other hand, the control device comprises a movement mode in which the movement of the transport device can be controlled. This means the movement mode does not have to be part of the display control device. Rather, the movement mode can be activated by the display control device. In the recording mode, all camera-specific functions such as, for example, zooming are triggered. Movements effected from the camera relative to the transport device are also controlled in the recording mode. The general spatial movement via the transport device, thus, is not controlled in this recording mode. Therefore, the broadcast director of the television broadcast does not completely lose control over the camera when the display device is in the display mode. Rather, the broadcast director or a staff member can still control the camera itself and the relative movements of the camera to the transport device, but he cannot anymore control the spatial movement of the camera via the transport device. In the display mode, this is up to the operator (particularly only the referee) of the display device or its display control device. In the display mode, thus, the display control device takes command over the movement mode.

According to a preferred embodiment, the device comprises a detection device for detecting the position of game equipment on the playing field. This detection can be effected in that a transmitter is attached to (in or on) the game equipment and a corresponding receiver is provided somewhere at or above the sports facility. Preferably, however, the distance of the display device to the game equipment and/or the distance of the display device to the playing field can be detected with the detection device. Thus, no transmitter has to be present in or on the game equipment.

Particularly preferred, the detection device—in addition to the display device—is mounted to the camera system or is jointly movable with the camera system. The display device and the detection device can also be integrated in one construction unit. Here, it can additionally be provided for simplification that the detection device is also controllable with the display control device.

The detection device enables that, in the display mode, the light beams can be projected onto the playing field via the display device depending on the position of the game equipment detected by the detection device.

In the same manner, the detection device enables also that in the movement mode, the display device, preferably fastened to the camera or to the carrier device of the transport device, is movable via the transport device depending on the detected position of the game equipment.

In principle, it shall not be precluded that the device according to the invention is additionally used for displaying images, drawings, graphics or others on the playing field. Preferably, however, the display device displays only a marking in the form of a distance to be observed on the playing field, and the light beams can be projected at least section-wise in the form of a circle (for example, a semi-circle or a quarter circle) at a set distance of, for example, 9.15 m around the game equipment on the playing field. This adjustable or prescribed (set) distance measure of the marking to be projected can preferably be stored or saved in a memory of the display control device.

According to a further preferred embodiment, the device comprises an operating unit for the display device. This can be formed as a computer or as a tablet computer. Preferably, the operating unit is formed as a simple remote control for operating the device. This remote control can be operated by a person who is specifically responsible for it. This can be, for example, the fourth official (referee assistant) who takes over several functions on the sideline during a football match. So he can decide by himself or at the instruction of the referee (for example via a headphone), when the display device is switched into the display mode.

Preferably, however, the remote control is operated by the referee. This has several advantages. For example, the remote control itself can comprise a position transmitter via which the position of the remote control on the playing field can be signally transmitted to a receiver of the detection device or can be detected by the detection device. Thus, the detection does not have to detect directly and with an additional complex system the position of the game equipment. Rather, the referee can press a starting button on the remote control in the moment when he is placing the game equipment on the position decided by him. Preferably the referee should place the remote control in this moment exactly on the game equipment, whereby the detection device at the same time detects the position of the remote control and thus also the position of the game equipment. Thereupon, all actions can be initiated: The display control device takes over the movement mode of the camera system, the transport device moves the camera together with the display device above the position detected with remote control, and the marking is projected via the display device around the game equipment on the playing field. In other words, the position of the game equipment on the playing field is, preferably only, detectable via remote control by placing the remote control on the game equipment and by simultaneously pressing the button on the remote control by the referee so that the position of the remote control transmitted to the detection device corresponds to the position of the game equipment.

In order to prevent undesired movement of the display device in the display mode, preferably the display mode and the movement mode can be activated via the remote control. In the case of the activated display mode and the activated movement mode, the movements of the transport device can only be controlled via the remote control.

The steps of a method include mounting a display device on a transport device movable above the playing field and projecting light beams representing the marking at least in sections in the shape of a circle, preferably in a distance of 9.15 m, around the game equipment onto the playing field by the display device which is mounted to the transport device.

Preferably—before the projecting—the position of the game equipment is detected by a detection device. This is effected particularly preferably through the steps positioning a remote control by a referee on the game equipment, pushing a button of the remote control when the remote control is positioned on the game equipment, and transmitting the position of the remote control to a receiver of the detection device via a position transmitter of the remote control jointly forming the detection device. The transmitting is triggered by pushing the button, and the transmitted position of the remote control corresponds to the position of the game equipment.

Particularly preferred in this method are the further steps of moving the camera together with the display device in a position substantially vertically above the game equipment, determining the distance between the display device and the game equipment, calculating the emitting angle of the light beams depending on the detected distance, and projecting the marking in a set distance (in this case, 9.15 m) around the game equipment onto the sports facility. The determining of the distance and the calculating of the angle can be omitted when the spatial height of the display device in the display mode is preset. For example, it can be set that in the display mode, the camera system and, thus, the display device are always moved to the same height (e.g., 10 m above the game equipment). Consequently, the distance and the emitting angle are always the same. Thus the emitting angle can be preprogrammed. Also, the determining of the position of the game equipment does not have to be effected via an autonomous detection device. Rather, it is sufficient—as already mentioned—when a transmitter is provided in the remote control which forms the detection device together with a receiver arranged somewhere at or on the sports facility, in which the receiver is signally connected with the display control device.

Also explained is the use of a movable transport device above a playing field of a sports facility for the mounting of a display device for projecting light beams representing a marking to be observed onto the playing field of the sports facility. The projected light beams can be projected at least in sections in the shape of a circle, in particular in a distance of 9.15 m, around the game equipment onto the playing field.

BRIEF DESCRIPTION OF THE DRAWINGS

Further details and advantages of the present invention are described more fully hereinafter by means of the specific description with reference to the embodiment illustrated in the single drawing:

FIG. 1 schematically shows a sports facility 2 with a device 1 for displaying a marking A on a playing field 22 of the sports facility 2. Concretely, a sports facility 2 in the form of a football stadium with a stadium roof 11 is illustrated.

DETAILED DESCRIPTION OF THE INVENTION

As increasingly used in recent years in large stadiums, also in FIG. 1 a "flying" camera system 21 is schematically illustrated. This camera system 21 comprises a camera 7 which in turn is spatially movable by a transport device 8 above the playing field 22. The transport device 8 substantially comprises the carrier device 9 for the camera 7, at least three, preferably at least four, ropes 10 mounted to the carrier device 9 and the drive devices 13 (e.g., in the form of motor-driven rope pulleys) for the ropes 10. These drive devices 10 can be arranged principally also on the stadium roof 11. Preferably, however, they are placed somewhere on the side of the playing field 22 and the ropes 10 are guided via guide rollers 12. Concretely, each guide roller 12 can be mounted to the stadium roof 11 via a holding device 19. Of course, posts separate from the stadium roof 11 can also be provided for holding the guide rollers 12.

A per se known camera system control device 6 can be used for the control of this camera system 21. It can be stored, for example, as a corresponding program on a computer. This computer then serves as an operating unit for the camera system 21. Preferably the camera system 21 is operated by staff member who is subordinated to a football broadcasting director. The camera system control device 6 comprises logical components in the form of operation modes. Such a mode is the recording mode $M_F$ in which the movements of the camera 7 relative to the transport device 8 and the camera-specific functions (zooming, focusing, etc.) are controlled. Corresponding camera control signals $20_F$ are emitted from the camera system control device 6 to the camera 7 or to a drive device (not shown) which moves the camera 7 relative to the carrier device 9. Moreover, a movement mode $M_B$ is a logical part of the camera system control device 6, and in the movement mode $M_B$, the spatial movement of the camera 7 by the transport device 8 above the playing field 22 of the sports facility 2 is controlled. Corresponding camera drive signals $20_B$ are emitted by the camera system control device 6 to the drive devices 13. For the spatial movement, a three-dimensional coordinate system representing the space above the playing field 22 is stored in the camera system control device 6.

According to the invention, a projecting device 3 is jointly movable with the transport device 8 above the playing field 22. Preferably, this projecting device 3 is detachably fastened to the transport device 8. In order to enable a retrofitting of this projecting device 3 on an existing transport device 8 (or on an existing camera system 21) the device 1 comprises a display control device 4 together with an interface 5 to the camera system control device 6. Light beams L or laser beams can be projected to the surface of the playing field 22 by the display device 3. Concretely, these light beams L project a circle or a part of a circle on the playing field 22, which circle indicates a marking A formed at a distance about game equipment 15 (e.g., a football). This distance in this example is 9.15 m and indicates how near to the game equipment 15 an opposing participant is allowed to be during a free kick. During a football match, this new system can be used as follows:

Before the football match—if the projecting device 3 is retrofitted—the projecting device 3 is mounted detachably to the camera system 21, preferably to the carrier device 9 of the transport device 8 of the camera 7. Moreover, the display control device 4 is signally connected to the camera system control device 6 via the interface 5.

If the projecting device 3 is already a part of the camera system 21 and is not retrofitted, the display control device 4 can immediately be integrated in the camera system control device 6. Thus, the control devices 4 and 6 form a logical control unit. However, there is still an internal mathematical-logical interface 5 between the display control device 4 and the camera system control device 6 in order to enable a linkage and a data transfer (position date of the camera system 21 in the coordinate system) especially during the display mode $M_A$.

Independent of whether the projecting device 3 is retrofitted, the projecting device 3 is normally inactive during the football match on the playing field 22. The projecting device 3, however, is always moving together with the camera system 21. The spatial movement of the camera 7 is carried out by the transport device 8. This movement is controlled by the movement mode $M_B$ of the camera system control device 6. In principle, this movement mode $M_B$ can also be part of the display control device 4, which is indicated by the dotted line. In the movement mode $M_B$, corresponding camera drive signals $20_B$ are emitted to the drive devices 13 of the transport device 8. During the football match, filming with camera 7 is controlled by the recording mode $M_F$ of the camera system control device 6. Its operation is primarily to behoove a staff member of the television broadcaster.

If now a free kick is given by the referee R during the football match, the projecting device 3 is especially used in cases when the free kick is in the vicinity of the goal. For that reason, this projecting device 3 is switch active via a remote control 17. This can be effected by a person who is specifically assigned for this. The easiest solution is that the referee R itself carries the remote control 17 and switches the display device 3 active, i.e., switches the projecting device 3 into the display mode $M_A$.

As of this moment, the display control device 4 signally connected (for example via radio) with the remote control 17 makes all authorizations for the movement mode $M_B$. This means that the movement mode $M_B$ of the transport device 8 is now executed depending the display mode $M_A$. Firstly, a position signal can be emitted to a receiver by a position transmitter 18 of the remote control 17 with the activation of the display mode $M_A$, whereby the transport device 8 in the movement mode $M_B$ is moved depending on this first position signal in the direction of the referee R. Thereby, a rough-positioning of the display device 3 in the vicinity of the referee R and, thus, in the area of the free kick to be executed is reached. This prevents excessively long interruptions of the match.

Next, in the display mode $M_A$, the detection device 14 for detecting the position $P_{15}$ of the game equipment 15 on the sports facility 2 is activated. There are several embodiments, wherein three examples are explained in the following.

According to a first variant, a position transmitter 18 can be arranged in or on (attached to) the game equipment 15, which position transmitter 18 together with the corresponding receiver 40 forms the detection device 14. The data of the position $P_{15}$ of the position transmitter 18 are then transmitted from the detection device 14 to the display control device 4.

A second variant provides that the detection device 14 comprises a game equipment identification system 30 which, for example, via a detection camera 31 scans the surface of the sports facility 2 for the game equipment 15. For that reason, the detection device 14 can be mounted to the transport device 8 or can be placed, however, also elsewhere in the stadium. As soon as the detection device 14 has localized the game equipment 15, its position $P_{15}$ is transmitted to the display control device 4.

According to a third and preferred variant, a position transmitter 18 is arranged in or on the mobile hand-held remote control 17 which transmits its position $P_{17}$ to the receiver 40. The position transmitter 18 and the receiver 40 together form the detection device 14. Also here, the receiver 40 can preferably be arranged on the transport device 8. In order to not only detect the position $P_{17}$ of the remote control 17 but also the position $P_{15}$ of the game equipment 15, the referee R presses a corresponding button ("game equipment position button") 35 of the remote control 17 in the moment when this remote control 17 is located on the game equipment 15. Thereby, the referee R "marks" the position $P_{15}$ of the game equipment 15 via the remote control 17. Thus, the detection device 14 simultaneously detects the position $P_{15}$ of the game equipment 15 from the position $P_{17}$ of the remote control 17 and transmits a corresponding signal to the display control device 4.

As now the position $P_{15}$ of the game equipment is known by the display control device 4, the movement mode $M_B$ is (again) activated. In this movement mode $M_B$, the transport device 8 is moved depending on the detected position $P_{15}$ of the game equipment 15. Preferably, the transport device 8 and especially the display device 4 is moved as exactly as possible to a coordinate system position vertically above the game equipment 15.

In order to subsequently project the marking A with the correct distance around the game equipment 15 on the playing field 22, again two variants are possible.

According to a first variant, the distance $D_{15}$ between the projecting device 3 and the game equipment 15 and/or the distance $D_2$ between the projecting device 3 and the playing field 22 are/is initially determined. This can be effected, for example, via a distance sensor which is mounted in or on the display device 3 or by calculating the distance between the display device 3 and the position $P_{15}$ of the game equipment "marked" by the referee R. Then, the emitting angle α of the light beams L is calculated based on the measured or calculated distance $D_{15}$ and/or the measured distance $D_2$. For that reason an appropriate algorithm—based on the set distance (here, 9.15 m) stored in the memory 16—is stored in the display control device 4 so that by radiating the light beams L in the calculated emitting angle α a circle with the correct circle radius of 9.15 m is projected around the game equipment 15 on the playing field 22.

Preferably, however, a second variant is provided according to which the emitting angle α is set or pre-programmed one-time. As soon as the display control device 4 receives the signal of the position $P_{15}$ or the game equipment 15, the projecting device 3 is moved to a preset distance exactly vertically above the game equipment 15. This means, each time the display mode $M_A$ is activated, the projecting device 3 is always moved to the same position relative to the game equipment 15. Hence, the emitting angle α of the light beams L must always be the same, and a one-time determination of the emitting angle α is sufficient to always project the circle with the correct circle radius of 9.15 m around the game equipment 15 on the playing field 22.

Subsequently, in order to actually project the marking A on the playing field 22, an appropriate signal $20_A$ is transmitted from the display control device 4 to the projecting device 3 which thereupon emits the light beams L.

If now the marking A is projected on the playing field 22, the participants are encouraged to keep the displayed distance to the game equipment 15. If this is not happening in time or in a sufficient extent, the referee R can penalize the player for example with a yellow card. In order to not interrupt the match for too long a time, an additional aid for the referee R can be provided by projecting a countdown of, for example, 5 seconds on the playing field 22 directly in front of the wall via the display device 3. Thus, each participant can recognize how long he still has time to achieve the projected distance.

In order to prevent that the game equipment 15 is removed from the position $P_{15}$ after determining the position $P_{15}$, a small point of light can be projected by the projecting device 3 onto the game equipment 15 or a small circle or pitch circle can be projected by the display device 3 directly around the game equipment 15 on the playing field 22.

As soon as all participants have reached the correct position, the referee can again continue the match by a blow of his whistle. With the first movement of the game equipment 15 by the team in ball possession, the opposing participants are also allowed to come nearer to the game equipment 15. With this continuation of the normal match, the display mode $M_A$ can also be deactivated. This can be effected by the referee R itself. However, as the referee R has again to concentrate on the match after the free kick, it is preferably provided that another person deactivates the display mode $M_A$, for example, via a second remote control 17. With the deactivation of the display mode $M_A$ the broadcast director has regained control over the movement mode $M_B$. During the display mode $M_A$ the broadcast director, however, had at least the control over the recording mode $M_F$ of the camera 7.

The remote control 17 can be formed arbitrary. For the basic functionality, there should be at least a "power button" and a "position button". With the "power button" the display mode $M_A$ is activated. With the "position button" the position $P_{15}$ of the game equipment 15 is marked as described above. Also, a "switch-off button" can be provided. A display screen installed on the remote control 17 is also helpful. The progress or the current status of the display mode $M_A$ can be visible via this display screen. For example, a signal—e.g., by a blinking or by vibration—can be outputted by the remote control 17. This signal indicates for the referee R that the marking A is projected correctly on the playing field 22. In addition, a "countdown button" can be provided as well.

Thus, with the present invention, a possibility is created to organize the match in the case of a free kick in a simple manner fairer and in particular faster without the necessity of providing complex additional display devices around the playing field and without limiting the decision-making power of the referee. Rather, according to the invention, the transport device of "flying" camera systems anyway often used in stadiums function as movable carriers for a free kick distance projecting device (=display device) above the playing field.

LIST OF REFERENCE SIGNS 1 device
2 sports facility anlage
3 display device
4 display control device
5 interface
6 camera system control device
7 camera
8 transport device
9 carrier device
10 ropes
11 stadium roof
12 guide rollers
13 drive devices
14 detection device
15 game equipment (football)
16 memory
17 remote control
18 position transmitter
19 holding device
20 signal
21 camera system
A marking
L light beams
$M_A$ display mode
$M_B$ movement mode
$M_F$ recording mode
$P_{15}$ position of the game equipment
$P_{17}$ position of the remote control
$D_2$ distance to the playing field
$D_{15}$ distance to the game equipment
R referee
α emitting angle

The invention claimed is:

1. A display device for displaying a distance marking on a playing field, the distance marking indicating a distance from an item of game equipment, said display device comprising:
a projecting device for projecting light beams representing the distance marking onto the playing field;
a transport device movable above the playing field, said projecting device being jointly movable with said transport device;
a detection device configured to detect a location of the item of game equipment and generate a position signal based on a detected location of the item of game equipment; and
a display control device having a movement mode for controlling said transport device to move said projecting device into position based on the position signal received from said detection device, and having a display mode for controlling said projecting device to project the light beams onto the playing field to display the distance marking on the playing field relative to the item of game equipment based on the position signal received from said detection device.

2. The display device according to claim 1, wherein said projecting device is configured to project the light beams to form the distance marking in the shape of at least a portion of a circle around the item of game equipment on the playing field.

3. The display device according to claim 2, wherein said projecting device is configured to project the light beams to form the distance marking to be a distance of 9.15 m from the item of game equipment.

4. The display device according to claim 1, wherein said detection device includes a position transmitter and a receiver.

5. The display device according to claim 4, wherein said position transmitter is on a mobile hand-held remote control unit.

6. The display device according to claim 4, wherein said position transmitter is to be attached to the item of game equipment.

7. The display device according to claim 1, wherein said detection device includes a game equipment identification system configured to scan the playing field to detect the location of the item of game equipment, the game equipment identification system including a detection camera.

8. The display device according to claim 1, wherein said projecting device is detachably fastened to said transport device.

9. The display device according to claim 1, further comprising a camera for filming a sports match on the playing field, said camera being detachably fastened to said transport device, and said camera being jointly movable with said projecting device and said transport device.

10. The display device according to claim 9, further comprising a camera system control device for controlling said camera, and said display control device including an interface for communicating with said camera system control device.

11. The display device according to claim 10, wherein said camera system control device has a recording mode for controlling filming effected by said camera and for controlling a movement of said camera relative to said transport device, and has a movement mode for controlling a movement of said transport device.

12. The display device according to claim 9, wherein said transport device comprises:

a carrier device for holding said camera;

a plurality of lines fastened to said carrier device;

guide rollers for guiding said lines, said guide rollers being fastened above the playing field; and a drive device for pulling the lines.

13. The display device according to claim 1, wherein said detection device is further configured to determine at least one of (i) a distance between said projecting device and the item of game equipment, and (ii) a distance between said projecting device and the playing field.

14. The display device according to claim 1, wherein said projecting device is configured to project the light beams to form the distance marking to be an adjustable distance from the item of game equipment.

15. The display device according to claim 1, wherein said projecting device is configured to project the light beams to form the distance marking to be a predetermined distance from the item of game equipment, the predetermined distance being stored in a memory of said display control device.

16. The display device according to claim 1, wherein said detection device includes a receiver mounted to said transport device, and a position transmitter on a mobile hand-held remote control unit for transmitting the position signal to said receiver.

17. The display device according to claim 16, wherein only said mobile hand-held remote control unit is able to detect the location of the item of game equipment on the playing field.

18. The display device according to claim 16, wherein said mobile hand-held remote control has a button configured to be pushed by an operator while said mobile hand-held remote control is held against the item of game equipment such that a position of said mobile 6 hand-held remote control transmitted to said detection device corresponds to the location of the item of game equipment.

19. The display device according to claim 16, wherein said mobile hand-held remote control is configured to activate the display mode and the movement mode of said display control device, wherein when said mobile hand-held remote control activates the display mode and the movement mode, a movement of said transport device is controlled only by said mobile hand-held remote control.

\* \* \* \* \*